United States Patent
Zou

(10) Patent No.: US 10,341,162 B2
(45) Date of Patent: Jul. 2, 2019

(54) AUGMENTED REALITY GAMING SYSTEM

(71) Applicant: Pacific Import Manufacturing, Inc., City of Industry, CA (US)

(72) Inventor: Yong Hui Zou, GuangDong (CN)

(73) Assignee: Pacific Import Manufacturing, Inc., City of Industry, CA (US)

( * ) Notice: Subject to any disclaimer, the term of this patent is extended or adjusted under 35 U.S.C. 154(b) by 0 days.

(21) Appl. No.: 15/702,203

(22) Filed: Sep. 12, 2017

(65) Prior Publication Data

US 2019/0081848 A1 Mar. 14, 2019

(51) Int. Cl.
*A63F 9/00* (2006.01)
*H04L 29/06* (2006.01)
*F41J 5/02* (2006.01)
*A63F 13/355* (2014.01)
*H04W 4/60* (2018.01)

(52) U.S. Cl.
CPC ...... *H04L 29/06034* (2013.01); *A63F 13/355* (2014.09); *F41J 5/02* (2013.01); *H04W 4/60* (2018.02); *A63F 2300/1031* (2013.01)

(58) Field of Classification Search
None
See application file for complete search history.

(56) References Cited

U.S. PATENT DOCUMENTS

| | | | |
|---|---|---|---|
| 7,583,275 B2 | 9/2009 | Neumann et al. | |
| 8,469,824 B1 * | 6/2013 | Farley | F41J 5/02 434/11 |
| 8,537,113 B2 | 9/2013 | Weising et al. | |
| 8,585,476 B2 * | 11/2013 | Mullen | A63F 13/25 463/1 |
| 8,951,128 B1 | 2/2015 | Farley et al. | |
| 9,132,342 B2 | 9/2015 | Balachandreswaran et al. | |

(Continued)

FOREIGN PATENT DOCUMENTS

| | | |
|---|---|---|
| CN | 103028243 | 4/2013 |
| CN | 205980941 | 2/2017 |

(Continued)

OTHER PUBLICATIONS

Dickerson, Larry. "Augmented Reality Gun for Apple and Android Devices". Published Mar. 3, 2015. Accessed Aug. 16, 2018. <https://www.youtube.com/watch?time_continue=96&v=RWndxago7Dc>.*

(Continued)

*Primary Examiner* — Seng Heng Lim
(74) *Attorney, Agent, or Firm* — Sheridan Ross P.C.

(57) ABSTRACT

An augmented reality gaming system uses a gameplay device to removably secure a mobile device. The gameplay device has at least one user interface and a wireless transceiver for communicating with the mobile device. An augmented reality gaming app stored in the memory of the mobile device utilizes an image sensor of the mobile device to display a live image on a screen of the mobile device, and causes graphics corresponding to one or more virtual targets to be overlaid on the live image. Using information from a location sensor and an orientation sensor of the mobile device, together with information about a virtual location of the virtual target, the mobile device determines whether a virtual shot triggered by the at least one user interface causes virtual damage to the virtual target.

20 Claims, 4 Drawing Sheets

(56) References Cited

U.S. PATENT DOCUMENTS

| | | | |
|---|---|---|---|
| 9,280,277 B2 | 3/2016 | Rosner | |
| 9,364,741 B2* | 6/2016 | Rosenberg | F41A 33/00 |
| 9,677,840 B2 | 6/2017 | Rublowsky et al. | |
| 2006/0105838 A1* | 5/2006 | Mullen | A63F 13/25 |
| | | | 463/31 |
| 2012/0122570 A1 | 5/2012 | Baronoff | |
| 2012/0280935 A1* | 11/2012 | Romero | G06F 1/1632 |
| | | | 345/174 |
| 2012/0282987 A1* | 11/2012 | Romero | G06F 3/041 |
| | | | 463/5 |
| 2013/0225288 A1 | 8/2013 | Levin et al. | |
| 2013/0344461 A1* | 12/2013 | Tello | F41G 3/2633 |
| | | | 434/21 |
| 2015/0300786 A1* | 10/2015 | Downing | H04W 84/12 |
| | | | 235/404 |
| 2016/0067616 A1 | 3/2016 | Yim et al. | |
| 2018/0196628 A1* | 7/2018 | Samo | G06F 3/1423 |

FOREIGN PATENT DOCUMENTS

| | | |
|---|---|---|
| KR | 20140011674 | 1/2014 |
| KR | 20140049436 | 4/2014 |
| KR | 20140127934 | 11/2014 |

OTHER PUBLICATIONS

"2017 Augmented Reality AR GUN for 3D VR Games Toy Gun Game DIY for iPhone 7 7PLUS Android IOS with Mobile Phone Holder," 2017, Xinwei Tech (Shenzhen) Co., Ltd., retrieved from https://webcache.googleusercontent.com/search?q=cache:dnZ4swjMzFkJ:https://www.dhgate.com/store/product/2017-augmented-reality-ar-gun-for-3d-vr-games/401824489.html+&cd=9&hl=en&ct=clnk&gl=us, 8 pages.

"AR Attack ARliens Augmented Reality (AR) Gun," 2017, TXC Technologies, retrieved from https://www.txctechnologies.com/store/accessories/phone-accessories/phone-addons/ar-attack-arliens-augmented-reality-ar-gun-alien-shooting-play-set-for-ios-and-android-augmented-reality-toy-gun-shooting-game-arliens-ios-and-android-free-app-download-13-tri, 3 pages.

"Are you killing aliens with Appgun for iPhone?," 2013, Yllcn. Com, retrieved from http://yllcn.com/iphone%E2%80%99a-ozel-appgun-ile-uzayli-oldurmeye-var-misiniz.html, 2 pages (with English machine translation).

"GDC 2014: Rescape Kickstarter Video," Mar. 18, 2014, 148Apps, retrieved from https://www.youtube.com/watch?v=IzvAu-QiZo4, 3 pages.

Crisp, "AppToyz reveals latest toys for smartphones or tablets," Nov. 1, 2012, New Atlas, retrieved from https://newatlas.com/apptoyz-new-toys/24832/, 7 pages.

Fincher, "AppTag revamps first-person shooters with augmented reality through smartphones," Feb. 28, 2012, New Atlas, retrieved from https://newatlas.com/apptag-augmented-reality-smartphone-shooter/21601/, 5 pages.

Nunal, "Best augmented reality (AR) games for Android," Jun. 11, 2012, Android Authority, retrieved from https://www.androidauthority.com/best-augmented-reality-ar-games-for-android-93520/, 12 pages.

Takahashi, "Google's Project Tango will enable cool augmented reality games (hands-on demo)," Jan. 7, 2016, VB Games, retrieved from https://venturebeat.com/2016/01/07/googles-project-tango-will-enable-cool-augmented-reality-games/, 3 pages.

Wong, "AppToyz creates an Augmented Reality iPhone blaster," Jan. 27, 2011, Ubergizmo, retrieved from http://www.ubergizmo.com/2011/01/apptoyz-augmented-reality-iphone-blaster/, 2 pages.

"How do I setup AR Gun with Bluetooth 4.0?" Maksco Toy Ltd, 2013, 14 pages [retrieved online from: www.arattack.com/setup-ar-gun].

* cited by examiner

AUGMENTED REALITY GAMING SYSTEM

FIELD OF THE DISCLOSURE

The present disclosure relates to augmented reality gaming systems, and more particularly to a smartphone-based augmented reality gaming system.

BACKGROUND

Augmented reality involves the overlay of computer-generated images or data on one or more images of a user's actual physical environment, which may be obtained, for example, from an image sensor such as a video camera. The basic concept of augmented reality is not new. U.S. Pat. No. 8,951,128, entitled "Device and Method for an Electronic Tag Game," describes a device combining a gun and target for facilitating a game of tag using infrared light communications and augmented reality. The device includes infrared transmitters and infrared receives to facilitate omnidirectional two-way communication between two or more devices and a shaped housing facilitating handling of the device by a user.

Additionally, U.S. Patent Application Publication No. US 2013/0225288 A1, entitled "Mobile Gaming Platform System and Method," describes a universal gaming controller and method for enabling connectivity between at least one physical host and at least one electronic device. The physical host has at least one physical trigger configured to be operated by a user thereof. The controller includes a housing configured to be physically coupled with the physical host and the electronic device, and a connector configured to allow transfer of data between the physical trigger and a port of the electronic device.

The references identified above are hereby incorporated by reference herein, in their entirety.

SUMMARY

The present disclosure describes an augmented reality gaming system for use with smartphones or other mobile devices. By utilizing the components of the smartphones or other mobile devices to determine position and orientation, the augmented reality gaming system described herein does not require infrared light transmitters or receivers to determine when a player or other target has been "tagged." This beneficially allows the augmented reality gaming system of the present disclosure to be used for games other than simple tag, and also beneficially reduces the power requirements of gameplay devices used in connection with the smartphones or other mobile devices as part of the augmented reality gaming system. Such gameplay devices may be equipped with components that require very little power, thus allowing such devices to be used for longer periods of time without recharging than is typical of existing gameplay devices using infrared transmitters and receivers.

An augmented reality gaming system according to one embodiment of the present disclosure comprises a gameplay device and a mobile device. The gameplay device comprises a mount; a first wireless transceiver; and a trigger. The mobile device comprises: a processor; a screen; an image sensor; a location sensor; an orientation sensor; a second wireless transceiver; and a memory. The memory stores an augmented reality gaming app comprising instructions for execution by the processor that, when executed by the processor, cause the processor to: display, on the screen, a live image received from the image sensor; receive location information from the location sensor; generate target information about at least one target; display, on the screen and based on the location information, a graphical depiction of the at least one target as an overlay on the live image; receive, via the second wireless transceiver and from the first wireless transceiver, an indication of activation of the trigger, wherein activation of the trigger corresponds to the firing of a virtual weapon; display an animation on the screen in response to the indication; receive orientation information from the orientation sensor; and calculate, based on the location information, the orientation information, and the target information, whether the firing of the virtual weapon caused virtual damage to the target.

The target information may comprise target location information and target size information. The first wireless transceiver may communicate with the second wireless transceiver using a Bluetooth protocol. The augmented reality gaming app may comprise additional instructions for execution by the processor that, when executed by the processor, further cause the processor to award points based on the amount of virtual damage caused to the target. The screen may be a touchscreen, and the augmented reality gaming app may comprise additional instructions for execution by the processor that, when executed by the processor, further cause the processor to receive, via the touchscreen, a user selection for one of a single player and a multiplayer game. The user selection may correspond to a multiplayer game, and the augmented reality gaming app may comprise additional instructions for execution by the processor that, when executed by the processor, further cause the processor to receive, via the second wireless transceiver, second location information about a location of a second mobile device. The second wireless transceiver may receive the second location information via a WiFi hub. The augmented reality gaming app may comprise additional instructions for execution by the processor that, when executed by the processor, further cause the processor to calculate, based on the location information, the orientation information, and the second location information, whether the firing of the virtual weapon caused virtual damage to a user of the second mobile device. The virtual weapon may be a gun, and the animation may depict a gunshot. The virtual weapon may be a grenade launcher, and the animation may depict a grenade launch and subsequent explosion.

An AR gaming system according to another embodiment of the present disclosure comprises a gaming device comprising an adjustable mount, a plurality of user interfaces, and a secondary wireless transceiver. The AR gaming system further comprises a first mobile device removably secured to the adjustable mount, the first mobile device comprising: a processor; a location sensor; an orientation sensor; an image sensor; a primary wireless transceiver; a screen; and a memory. The memory may store instructions for execution by the processor that, when executed by the processor, cause the processor to: establish a multiplayer gaming session among a plurality of mobile devices including the first mobile device, each of the plurality of mobile devices corresponding to a player; receive, via the primary wireless transceiver, information about a location of the plurality of mobile devices other than the first mobile device; receive location information about the first mobile device from the location sensor; transmit, via the primary wireless transceiver, the location information; generate target information about a plurality of virtual targets, the target information comprising at least target location information and target orientation information; transmit the target information via the primary wireless transceiver; display, on the screen, a live image based on data received from the image sensor; receive orientation information about the first mobile device from the orientation sensor; and selectively display on the screen, based on the location information, the orientation information, and the target information, at least one virtual image representing a target, the at least one virtual image overlaid on the live image.

The memory may store additional instructions for execution by the processor that, when executed by the processor, further cause the processor to: receive, from the secondary wireless transceiver and via the primary wireless transceiver, a signal indicating user interaction with one of the plurality of user interfaces; display, on the screen and based on the signal, an image sequence; and transmit, via the primary wireless transceiver, information corresponding to the signal. The plurality of user interfaces may correspond to different virtual weapons, and the signal may correspond to the firing of the virtual weapon corresponding to the one of the plurality of user interfaces. The memory may store additional instructions for execution by the processor that, when executed by the processor, further cause the processor to calculate, based on at least the orientation information, the location information, and the target information, whether the firing of the virtual weapon caused virtual damage to at least one of the plurality of targets or at least one of the players corresponding to the plurality of mobile devices other than the first mobile device. The calculation may be further based upon information about the virtual weapon corresponding to the one of the plurality of user interfaces. A change in the target orientation information may result in a change in the at least one virtual image.

A gaming system according to yet another embodiment of the present disclosure comprises: a gameplay device configured to hold a mobile device, the gameplay device comprising at least one trigger and a first wireless transceiver, the mobile device comprising: a processor; a touchscreen; a location sensor; an orientation sensor; an image sensor; a second wireless transceiver; and a memory. The memory stores instructions for execution by the processor that, when executed by the processor, cause the processor to: display a live image on the touchscreen based on a signal from the image sensor; generate target information about at least one target; overlay an graphic on the live image based on the target information, the graphic corresponding to the at least one target; receive an indication, from the first wireless transceiver and via the second wireless transceiver, that the at least one trigger has been pulled, the indication corresponding to the firing of a virtual weapon; receive orientation information from the orientation sensor; and determine, based on the orientation information and the target information, whether the firing of the virtual weapon resulted in virtual damage to the at least one target.

The virtual weapon may be one of a rifle and a grenade launcher. The gameplay device may comprise a plurality of triggers, and each of the plurality of triggers may correspond to a different virtual weapon. The memory may store additional instructions for execution by the processor that, when executed by the processor, cause the processor to transmit the target information via the second wireless transceiver; and receive, via the second wireless transceiver, information about a location of a second mobile device.

The terms "memory" and "computer-readable memory" are used interchangeably and, as used herein, refer to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable medium is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as $X_1$-$X_n$, $Y_1$-$Y_m$, and $Z_1$-$Z_o$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_o$).

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

DETAILED DESCRIPTION

Figure 1:
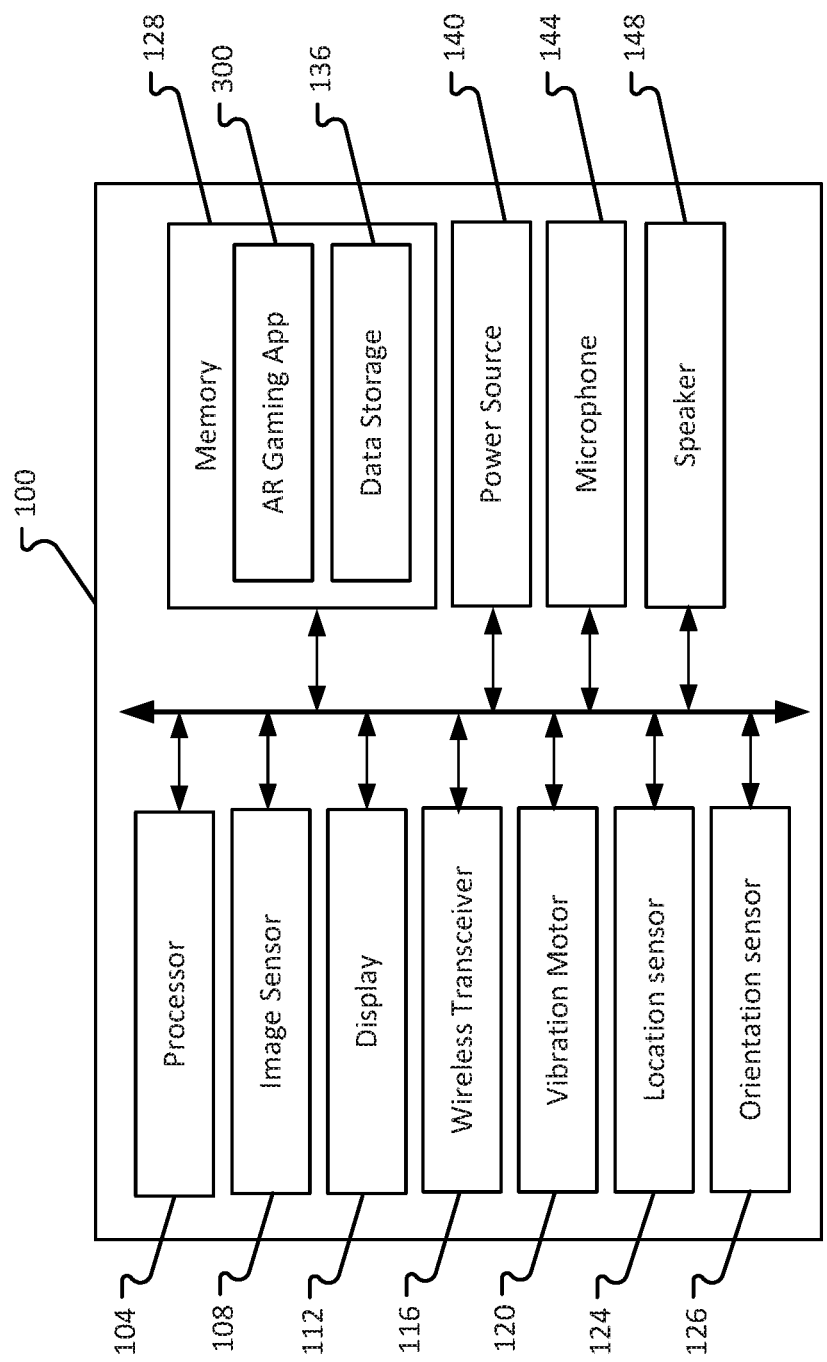
FIG. 1 is a block diagram of a mobile device according to embodiments of the present disclosure.

Before any embodiments of the present disclosure are explained in detail, it is to be understood that the disclosure is not limited in its application to the details of construction and the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, the present disclosure may use examples to illustrate one or more aspects thereof. Unless explicitly stated otherwise, the use or listing of one or more examples (which may be denoted by "for example," "by way of example," "e.g.," "such as," or similar language) is not intended to and does not limit the scope of the present disclosure.

With reference first to FIG. 1, a mobile device 100 for use in embodiments of the present disclosure may comprise, for example, a processor 104, an image sensor 108, a display 112, a wireless transceiver 116, a vibration motor 120, a location sensor 124, an orientation sensor 126, a memory 128, a power source 140, a microphone 144, and a speaker 148.

The processor 104 may correspond to one or multiple microprocessors that are contained within a housing of the mobile device 100. The processor 104 may comprise a Central Processing Unit (CPU) on a single Integrated Circuit (IC) or a few IC chips. The processor 104 may be a multipurpose, programmable device that accepts digital data as input, processes the digital data according to instructions stored in its internal memory, and provides results as output. The processor 104 may implement sequential digital logic, as it has internal memory. As with most known microprocessors, the processor 104 may operate on numbers and symbols represented in the binary numeral system. The processor 104 may execute instructions stored in a firmware thereof, and may also execute instructions stored in the memory 128. The processor 104 may be used to control one or more aspects of one or more of the image sensor 108, the display 112, the wireless transceiver 116, the sensor(s) 120, the location sensor 124, the power source 140, the microphone 144, and the speaker 148. The processor 104 may also be used to read data from or to write data to the memory 128, and may be configured to execute instructions stored within the memory 128.

The image sensor 108 may be, for example, a digital camera, and may use, for example, a CMOS image sensor or a CCD device. The image sensor 108 may comprise a lens, and may function by continuously and directly receiving a live image formed by the lens and projected by the lens onto a CMOS image sensor, a CCD device, or other image sensor. The image sensor 108 may convert the incoming light into electrical signals that can be used to display a live image, corresponding to the image formed by the lens, on the display 112. The image sensor 108 may include a dedicated processor and/or memory, and may comprise various features known to those of skill in the art, including, for example, optical zoom, digital zoom, autofocus, vignetting, optical aberration correction, and optical image stabilization. These features may be provided as part of the image sensor 108 itself (e.g. as a set of instructions stored in dedicated memory of the image sensor 108, for execution by a dedicated processor of the image sensor 108), in firmware stored in the memory 128 and used to operate the image sensor 108, or in any other set of instructions available to the processor 104 or to a dedicated image processor. The image sensor 108 may be manufactured, for example and without limitation, by any one of Toshiba Corp., ST Microelectronics N.V., Sharp Corp., Omnivision Technologies, Inc., AXIS, and ON Semiconductor. The image sensor 108 may or may not be configured to capture, and store in the memory 128, still photographs and/or video recordings.

The display 112 may be used to display live images, animations, video, text, and/or information to a user of the mobile device 100. In particular, the display 112 may be used to display live images sensed by the image sensor 108, and may further be used to display images, animations, text, and/or other information that is not received from the image sensor 108. In some embodiments, the additional images, animations, text, and/or other information that is not received from the image sensor 108 may be generated by the processor 104 or by another processor.

Figure 4:
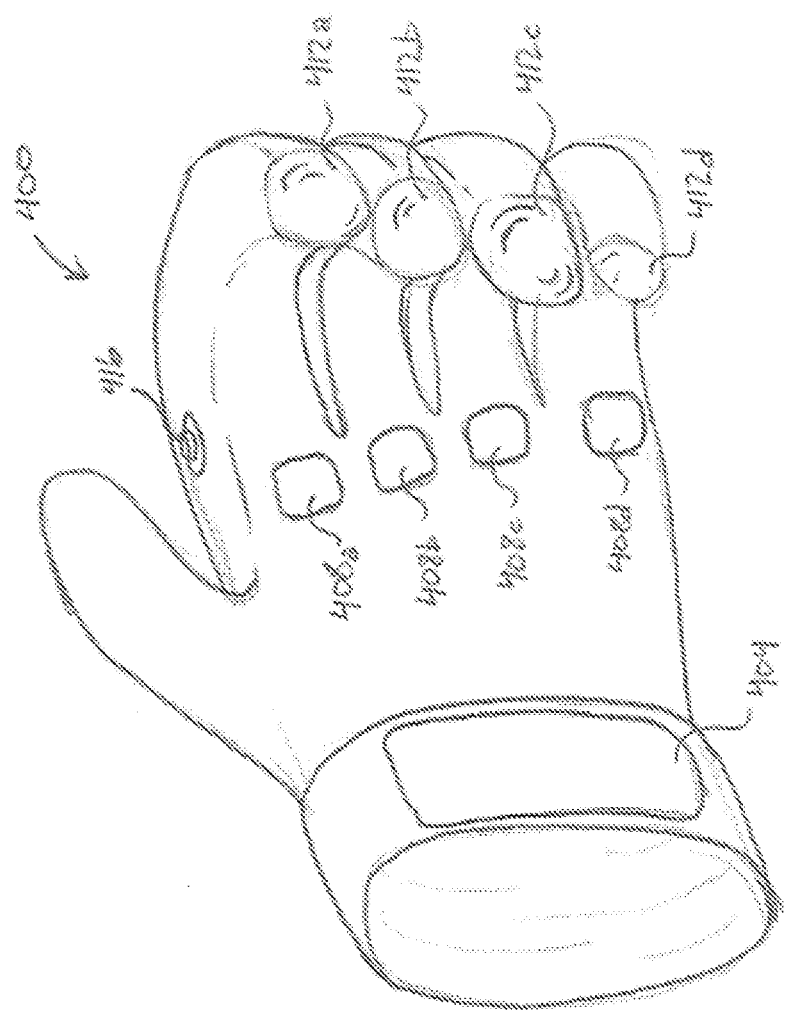
FIG. 4 illustrates a glove according to another embodiment of the present disclosure.

The display 112, which may in embodiments be an LCD screen, an LED screen, an OLED screen, an AMOLED screen, a Super AMOLED screen, a TFT screen, an IPS screen, a TFT-LCD screen, or any other known variety of screen, may be a touchscreen, and may be used to present virtual buttons or other controls to a user for setup of the mobile device 100 and/or for setup of, or other interaction with, an AR gaming app 300 and/or a gameplay device 200 (FIG. 2) or glove 400 (FIG. 4). Such virtual buttons or controls may be useful, for example, for configuring settings of the mobile device 100, such as wireless communication settings, volume settings, and brightness settings; for accessing various apps or other programs available through the mobile device 100; and for controlling one or more aspects of an AR gaming app 300.

The wireless transceiver 116 comprises hardware that allows the mobile device 100 to join one or more communication networks, as well as to connect with other devices having wireless communication capability. For example, the wireless transceiver 116 may allow the mobile device 100 to connect with a cellular network, or with a WiFi or other wireless network. The wireless transceiver 116 may also allow the mobile device 100 to connect directly with a smartphone, tablet, laptop, or Bluetooth-enabled device. The wireless transceiver 116 may further allow the mobile device 100 to connect with another computing or memory device equipped for wireless communications.

The wireless transceiver or wireless communication device 116 may comprise one or more of a Bluetooth interface, a Wi-Fi card, a Network Interface Card (NIC), a cellular interface (e.g., antenna, filters, and associated circuitry), a near field communication (NFC) interface, a ZigBee interface, a FeliCa interface, a MiWi interface, a Bluetooth low energy (BLE) interface, or the like. Regardless of the protocol used by the wireless transceiver 116, the wireless transceiver 116 may comprise, for example, a transmitter, a receiver, and an antenna, and may also comprise software or firmware needed to operate such components.

The vibration motor 120 may be the same as or similar to vibration motors commonly used in mobile devices, including mobile devices in the Apple iPhone series, the Samsung Galaxy series, and others. The vibration motor 120 may comprise a rotational motor that causes vibration by spinning an eccentric rotating mass (e.g. an unbalanced weight). Alternatively, the vibration motor 120 may comprise a linear motor that causes vibration by moving a weight back and forth. In some embodiments, the vibration motor 120 may be a linear resonant motor, or a piezoelectric actuator. The vibration motor 120 may be activated, for example, by the AR gaming app 300 in response to one or more predetermined events.

The location sensor 124 may be any location sensor or combination of location sensors that enables the physical location of the mobile device 100 to be determined. For example, the location sensor 124 may be equipped to use a space-based navigation system, such as the global positioning system ("GPS") owned by the United States and operated by the U.S. Air Force, and/or the global navigation satellite system ("GLONASS") owned by Russia and operated by the Russian Federal Space Agency. The location sensor 124 may additionally or alternatively be equipped and configured to utilize multilateration of radio signals received from a plurality of cell towers to determine location, and/or to determine location at least in part using one or more Wi-Fi signals. In some embodiments, the location sensor 124 may be configured to utilize a combination of two or more methods or systems for determining location. For example, the location sensor 124 may be configured to use a combination of GPS or GLONASS and multilateration using signals from cell towers. The location sensor 124 may be or include, for example, a Broadcom BCM47734 chip, or a Broadcom BCM4773 or BCM4774 chip. The location sensor 124 may additionally or alternatively be a chip or plurality of chips manufactured by any other manufacturer or combination of manufacturers, such as, by way of example only, Futurlec, Furuno Electric Co., Sparkfun Electronics, Maxim Integrated, Naysync, Skyworks Solutions, Inc., and Qualcomm Inc.

The orientation sensor 126 may comprise one or more accelerometers, a gyroscope, and/or any other sensors capable of determining orientation of the mobile device 100. In some embodiments, the orientation sensor 126 may comprise a plurality of sensors, each of which may detect orientation on a single axis, or each of which may detect orientation on multiple axes. In embodiments with a plurality of sensors, each orientation sensor may be used to cross-check one or more other orientation sensors to ensure accuracy. In some embodiments, the orientation sensor 126 may comprise a magnetic sensor such as a compass. In some embodiments, the orientation sensor 126 is capable of determining orientation along at least one axis. For example, the orientation sensor 126 may be capable of determining in which compass direction the mobile device 100 is pointed. In other embodiments, the orientation sensor 126 may be capable of determining orientation along a plurality of orthogonal axes. For example, the orientation sensor 126 may be capable of determining in which compass direction the mobile device 100 is pointed (e.g. degree of yaw about a vertical axis), as well as whether the mobile device 100 is pitched up or down (e.g. degree of rotation about a first horizontal axis), and whether the mobile device 100 is rolled left or right (e.g. degree of rotation about a second horizontal axis orthogonal to the first horizontal axis). The orientation sensor 126 may comprise one or more micro-electro-mechanical system (MEMS) sensors, such as a MEMS gyroscope manufactured by STMicroelectronics.

The memory 128 may correspond to any type of non-transitory computer-readable medium. In some embodiments, the memory 128 may comprise volatile or non-volatile memory and a controller for the same. Non-limiting examples of memory 128 that may be utilized in the mobile device 100 include RAM, ROM, buffer memory, flash memory, solid-state memory, or variants thereof. The memory 128 may be accessible by the processor 104 via, for example, a Serial Peripheral Interface bus.

The memory 128 may store an AR gaming app 300 such as that described below in connection with FIG. 3. The memory 128 may also comprise a data storage section 136, which may store any electronic data corresponding to, for example, data used by the AR gaming app 300 and/or data saved to the data storage section 136 by the AR gaming app 300. Such data may be or comprise, for example, scoring data (including high score data), game progress data, game history data, video replay files, and screenshots. The memory 128 may also store, whether in the data storage section 136 or elsewhere, instructions for execution by the processor 104. Such instructions may comprise, for example, instructions that enable the mobile device 100 to utilize one or more of the various components of the mobile device 100 (e.g., firmware, drivers), and/or to carry out operations and functions beyond those described herein. In some embodiments, the memory stores an operating system and a plurality of apps, in addition to the AR gaming app 300.

The power source 140 may comprise one or more batteries or other energy storage devices storing energy for powering the processor 104, the image sensor 108, and the other powered components of the mobile device 100. The batteries or other energy storage devices may be removable and replaceable, and/or the batteries may be rechargeable. In embodiments with rechargeable batteries, the mobile device 100 may comprise a port configured to receive a wire or cable for recharging the one or more batteries or other energy storage devices. Additionally, the power source 140 may comprise circuitry for receiving power from the one or more batteries, other energy storage devices, and/or an external source, and for accomplishing any signal transformation, conversion or conditioning needed to provide an appropriate power signal to such components. In some embodiments, an external power source may be connected to the mobile device 100 for powering the mobile device 100 when the power source 140 is depleted.

The microphone 144 may be useful, for example, to capture verbal or other audible communications from a user of the mobile device 100 for transmission to one or more other users of mobile devices utilizing an AR gaming app 300. For example, during multiplayer use of the AR gaming app 300, a user of the mobile device 100 may communicate with other participants in the multiplayer session using the microphone 144 (and the speaker 148, described below). Such communications may be transmitted via the wireless transceiver 116 using any available communication network (including a Wi-Fi network and/or a cellular network), or using a direct, peer-to-peer connection. In some embodiments, the microphone 144 may also be used to capture verbal commands for controlling one or more aspects of the AR gaming app 300. In such embodiments, the processor 104 may be configured to detect, interpret, and respond to such verbal commands by executing one or more instructions stored in the memory 128 and corresponding to the given command.

The speaker 148 may be used for playing audible sounds, whether such sounds are originated by the AR gaming app 300 (e.g. background music; sound effects; verbal instructions, commentary, or feedback), or received via the wireless transceiver 116 (e.g. voice or other audible communications transmitted by mobile devices of other players of the AR gaming app 300), or based on data stored in the memory 128. The speaker 148 may be any speaker suitable for use in a relatively small electronic device such as a tablet, smartphone, or other mobile device.

The mobile device 100 may comprise, in some embodiments, other components not listed here. The mobile device 100 may also comprise, in some embodiments, fewer than all of the components identified above. Also in some embodiments, the function or functions of two or more components described above may be provided by a single component or device, while the function or functions of one component described above may be provided by a plurality of components or devices.

Figure 2:
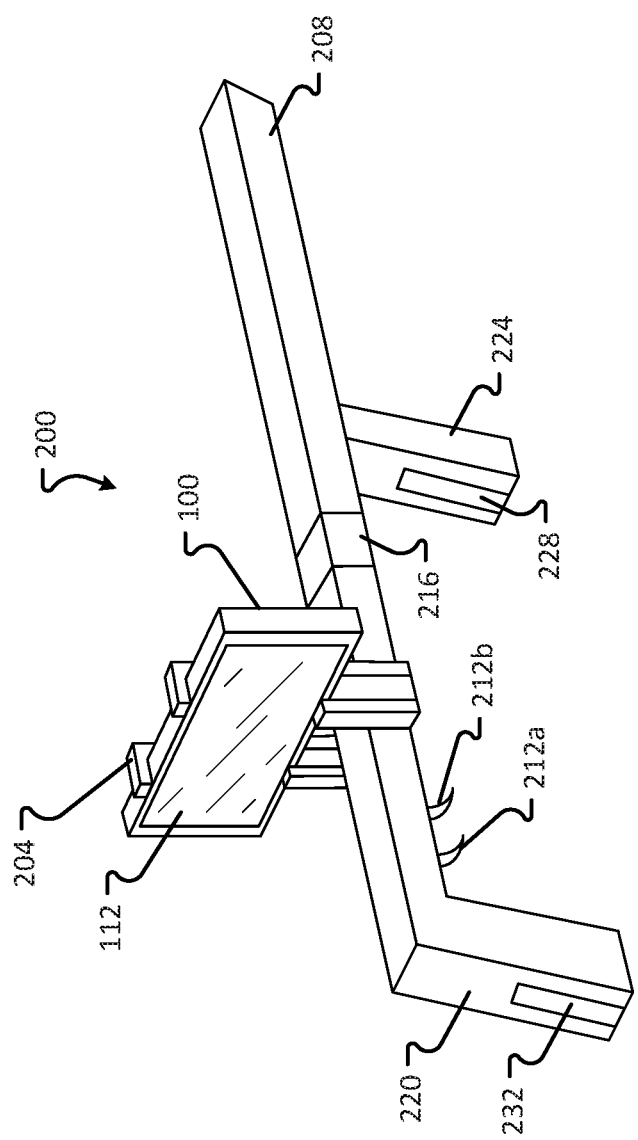
FIG. 2 illustrates a gameplay device according to one embodiment of the present disclosure.

FIG. 2 depicts a gameplay device 200 for use in connection with the AR gaming app 300. The gameplay device 200 is in the form of a gun or pistol, with a handle 220 and a barrel 208. In other embodiments, the gameplay device 200 may have a different form. Additionally, while the features of the gameplay device 200 are described herein as corresponding to components or aspects of a gun, persons of ordinary skill in the art will recognize that similar features may be provided as corresponding to components or aspects of a gameplay device 200 having a different form.

The gameplay device 200 comprises a mount 204 for holding a mobile device 100. The mount 204 is configured to orient the mobile device 100 so that a display 112 of the mobile device 100 is visible by a user of the gameplay device 200. The mount 204 is also configured to hold the mobile device 100 without inhibiting the operation of an image sensor 108 of the mobile device 100. The image sensor 108 is positioned on the opposite side of the mobile device 100 as the display 112, so as to sense the visible environment of the gameplay device 200 in the direction of the barrel 208 (e.g. in front of the gameplay device 200).

The mount 204 may be adjustable by the user. For example, the mount 204 may be slidable along the length of the barrel 208. The mount 204 may permit the mobile device 100 to be oriented to different configurations, including with a slant or tilt to one side of the gameplay device 200 or the other, and/or with a slant or tilt downward toward the gameplay device 200 or upward away from the gameplay device 200. Providing the ability to customize the orientation of the mobile device 100 by adjusting the mount 204 may beneficially permit users of the gameplay device 200 to configure the gameplay device 200 to better suit their individual physical attributes and their individual preferences, thus resulting in greater user satisfaction.

In some embodiments, the mount 204 may comprise a cable or other wire or collection of wires that may be removably attached to a port on the mobile device 100. Such a cable, wire, or collection of wires may be used to provide power (e.g. electricity) to the mobile device 100, and/or for the transfer of data to or from the mobile device 100.

The gameplay device 200 also comprises a Bluetooth module 216 or other wireless transceiver. The Bluetooth module 216 is configured to communicate wirelessly with the mobile device 100. In some embodiments, the Bluetooth module 216 may be configured only to transmit signals to the mobile device 100, but not to receive signals from the mobile device 100. In other embodiments, any wireless transceiver configured to broadcast electromagnetic signals, such as a Wi-Fi adapter or a cellular phone chip, may be utilized instead of the Bluetooth module 216. The Bluetooth module 216 may be equipped to communicate wirelessly using the Bluetooth protocol, and/or using the Bluetooth low energy (BLE) protocol. In embodiments using a wireless transceiver configured for wireless communications using a protocol other than a Bluetooth or BLE protocol, the wireless transceiver may be the same as or similar to the wireless transceiver 116 of the mobile device 100.

Transmission of one or more signals from the Bluetooth module 216 to the mobile device 100 occurs in response to a user of the gameplay device 200 pulling or otherwise activating one or both of the triggers 212a and 212b. Each trigger 212a and 212b causes a different signal or plurality of signals to be sent from the Bluetooth module 216 to the mobile device 100, such that the mobile device 100 (or, more particularly, the processor 104 of the mobile device 100) can distinguish between an indication that the trigger 212a has been activated and an indication that the trigger 212b has been activated. In some embodiments, the gameplay device 200 may comprise one or more additional triggers such as the triggers 212a and 212b. The gameplay device 200 may also comprise one or more other buttons, switches, toggles, and/or other devices, the activation or adjustment of each of which may cause a distinct signal to be sent from the Bluetooth module 216 to the mobile device 100. The activation of the triggers 212a and 212b and/or of any other buttons, switches, toggles, or other devices provided on the gameplay device 200 may correspond to specific aspects of the AR gaming app 300 (such as the firing of a virtual weapon), as discussed in greater detail below. Although the gameplay device 200 is depicted has having two triggers 212, the gameplay device 200 may have only one trigger in some embodiments. Additionally, in some embodiments, one or more user interfaces other than a trigger may be provided on the gameplay device 200 instead of the triggers 212.

The gameplay device 200 comprises, in at least some embodiments, a power source 228. The power source 228 may be configured to provide power to the Bluetooth module 216, and/or to provide supplemental power to the mobile device 100 (e.g. to extend the life of a power source 140 of the mobile device 100, and thus to enable longer use of the mobile device 100). In some embodiments, the gameplay device 200 may comprise other powered components, each of which may be powered by the power source 228. Like the power source 140, the power source 228 may comprise one or more batteries or other energy storage devices storing energy for powering the Bluetooth module 216 and, in embodiments with other powered components on the gameplay device 200, the other powered components of the gameplay device 200. The batteries or other energy storage devices may be removable and replaceable, and/or the batteries may be rechargeable. In embodiments with rechargeable batteries, the power source 228 may comprise a port configured to receive a wire or cable for recharging the one or more batteries or other energy storage devices. Additionally, the power source 228 may comprise circuitry for receiving power from a battery or other energy storage device or from an external source and accomplishing any signal transformation, conversion or conditioning needed to provide an appropriate power signal to such components.

In some embodiments, including the illustrated embodiment, the power source 228 may be integrated into a grip 224 or other existing component of the gameplay device 200. In other embodiments, the power source 228 may be shaped or otherwise provided with or in the form of a bullet magazine, or in the barrel 208. The power source 228 may be integrated into a removable component of the gameplay device 200, so that it can be easily removed for recharging, and/or replaced with a similar or identical component with a fresh power source 228. In embodiments of the gameplay device 200 in which the Bluetooth module 216 is the only powered component of the gameplay device 200, the power source 228 may beneficially need only a minimal amount of power for operation, thus reducing the need for an easily replaceable and/or rechargeable power source 228.

In some embodiments, the gameplay device 200 may comprise, instead of or in addition to a power source 228, a port for receiving power from an external power source, such as the mobile device 100.

The gameplay device 200 further comprises a vibration motor 232, which may be the same as or similar to the vibration motor 120 on the mobile device 100. As with the vibration motor 120, the vibration motor 232 may be activated, for example, by the AR gaming app 300 in response to one or more predetermined events, such as the firing of a virtual weapon by a user of the mobile device 100 and AR gaming app 300, or when the user of the mobile device 100 and AR gaming app 300 is virtually "hit" by an enemy's virtual weapon.

Figure 3:
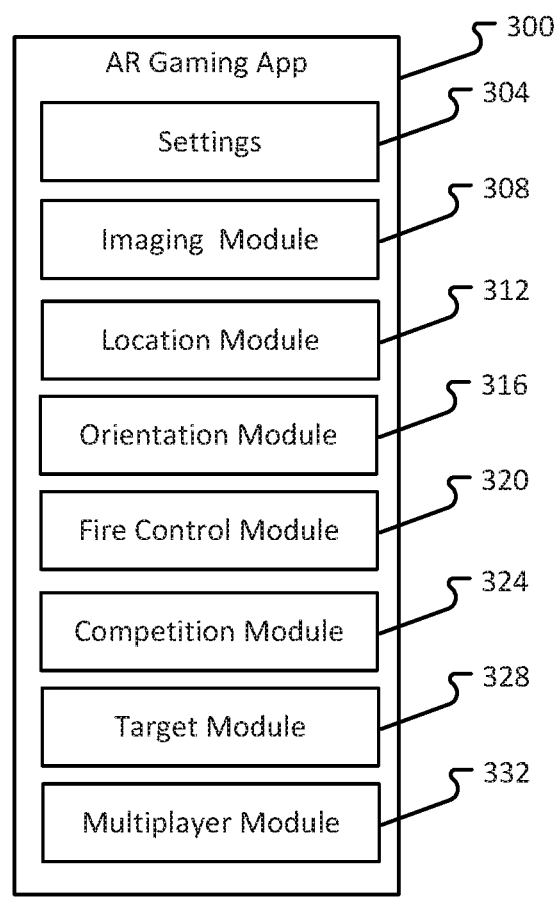
FIG. 3 is a block diagram of an augmented reality gaming app according to embodiments of the present disclosure.

Turning to FIG. 3, an AR gaming app 300 may comprise a plurality of modules, including, by way of example but not limitation, a settings module 304; an imaging module 308; a location module 312; an orientation module 316; a fire control module 320; a competition module 324; a target module 328, and a multiplayer module 332. The AR gaming app 300 may comprise additional or fewer modules. In some embodiments, some or all of the features of one of the modules described herein may be combined with some or all of the features of another one or more of the modules described herein. Also in some embodiments, the features described herein as included within one module could be provided in two or more separate modules.

Additionally, each of the modules described herein may comprise instructions for execution by the processor 104 of the mobile device 100, and/or by another processor of the mobile device 100. One or more of the modules may also comprise stored data for use by the processor 104 when executing the instructions contained in the module. Such data may include, for example, one or more graphics files for use in generating graphics for display on the display 112 of the mobile device 100, and/or one or more sound files for use in generating sounds on the speaker 148 of the mobile device 100. One or more of the modules may further cause data to be stored in the memory 128 as a result of executing the instructions contained in the module. Such data may include, for example, game progress data; saved game data; screenshots captured during gameplay; videos captured during gameplay; individual and/or team scores; past individual and/or team scores; high scores; and user preferences.

The AR gaming app 300 allows a user of the mobile device 100 to play an augmented reality game, in which the user moves through his or her actual physical environment with the gameplay device 200 and the mobile device 100, and uses the gameplay device 200 and mobile device 100 to virtually shoot at or otherwise interact with virtual targets or other objects that are depicted on the screen 112 of the mobile device 100. In some embodiments, the augmented reality game may be a multiplayer game, in which each player has a gameplay device 200 and a mobile device 100. In a multiplayer game, the players may use their respective mobile device 100 and gameplay device 200 to virtually shoot at other players, in addition to or instead of virtually shooting at or otherwise interacting with virtual objects displayed on their respective screens 112.

The settings module 304 may comprise instructions for execution by the processor that, when executed by the processor, cause one or more configuration options to be presented to the user (e.g., via the display 112). The settings module 304 may contain instructions allowing the user to select, for example, whether to play a single player or multiplayer game; a hardness level for the game (e.g., easy, medium, difficult, insane); a theme for the game (e.g. zombies, aliens, cops and robbers, soldiers and terrorists, robots, war machines); a soundtrack for the game; a weapon (or a plurality of weapons) for the game; and weapon features for the game. The settings module 304 may also comprise instructions, for example, allowing the user to configure wireless communication settings for the game, set volume levels for the game, pair a gameplay device 200 with the mobile device 100 for the game, and/or download and install updates for the AR gaming app 300. The settings module 304 may initialize upon launching of the AR gaming app 300, and/or may be accessible to the user before and/or during a game by selecting an icon, a menu item, or another link that accesses the settings module 304.

The imaging module 308 may comprise instructions for causing the processor 104 to generate images for display on the display 112. The images caused to be displayed by the imaging module 308 may be based on information received from one or more other modules of the AR gaming app 300. For example, when the AR gaming app 300 is first opened, the imaging module 308 may cause the processor 104 to display graphics based on information received from the settings module 304, allowing the user to select a type of game, a game theme, and a game difficulty level. As persons of ordinary skill in the art will appreciate based on the present disclosure, a plurality of modules of the AR gaming app 300 may be executed or otherwise utilized simultaneously to present a seamless presentation to the user.

During gameplay, the imaging module 308 may be configured to activate the image sensor 108 and to continuously display, on the display 112, a live image received through a lens of or associated with the image sensor 108. This live image constitutes a digital depiction of a portion of the user's actual environment. For example, if the user (together with the user's mobile device 100) is facing a forest, then the live image caused to be displayed on the display 112 by the imaging module 308 may be the portion of the forest within the field of view of the image sensor 108. If the user (together with the user's mobile device 100) is facing a room, then the live image displayed on the display 112 by the imaging module 308 may be the portion of the room within the field of view of the image sensor 108. The imaging module 308 may also be configured to generate one or more graphics, and to overlay the graphics on the live image, so that the user sees not just an image of reality (e.g., the depiction of the user's real environment), but rather an image that combines real environment with computer-generated graphics, or augmented reality. The graphics may be or include, for example, graphical depictions of targets to be shot by the user (generated based at least in part on information from the target module 328), and one or more textual or graphical presentations regarding the status of the user's character within the game. For example, such textual or graphical presentations may provide information to the user about the location of the user's character within the game arena. The game arena may be defined by actual physical boundaries (e.g. fences, sidewalks, roads, buildings) detected by accessing a mapping database such as Google Maps or Apple Maps, or a satellite imagery database such as Google Earth, or may be defined by virtual boundaries selected by the AR gaming app 300 or input by a user of the AR gaming app 300. The imaging module 308 may or may not cause one or more graphics depicting or highlighting the boundaries of the game arena to be displayed on the display 112.

In some embodiments, the imaging module 308 may comprise instructions for analyzing the image(s) sensed by the image sensor 108 and overlaying one or more computer-generated graphical elements on the image sensed by the image sensor 108 so as to give the appearance that the computer-generated graphical elements are interacting with the actual environment. For example, the imaging module 308 may be configured to display a target (e.g., a zombie, an alien, a robber, a terrorist, a robot, a war machine) in such a way as to give the appearance that the target is hiding or otherwise at least partially concealed behind an actual environmental feature, such as a tree, bush, building, fence, or hill.

The location module 312 may comprise instructions for determining a location of the mobile device 100, whether relative to a defined game arena, relative to other players in a game hosted by the AR gaming app 300, and/or relative to the physical world. The location module 312 may, for example, comprise instructions for accessing and utilizing the location sensor 124, so as to obtain location information from the location sensor 124. The location module 312 may further comprise information about a defined game arena, other players in the game, or the physical world (which information may be obtained, for example, by user input, from the mobile devices of other players in the game, and/or from a mapping database, a terrain database, or another geographic information system). The location module 312 may also comprise instructions for reporting a determined location to one or more of the imaging module 308 (e.g. to assist the imaging module 308 in consistently presenting targets or other virtual information on the display 112) and/or the other modules of the AR gaming app 300.

The orientation module 316 may comprise instructions for determining an orientation of the mobile device 100. The orientation module 316 may, for example, comprise instructions for accessing and utilizing the orientation sensor 126, so as to obtain orientation information from the orientation sensor 126. The orientation module may further be configured to provide orientation data to the imaging module 308, so as to enhance the ability of the imaging module 308 to depict virtual targets as they would be seen by the user based on the orientation of the mobile device 100. The orientation module 316 may also be configured to provide orientation data to the fire control module 320, for use by the fire control module 320 in determining the accuracy of shots fired by the user during a game hosted by the AR gaming app 300.

The fire control module 320 may comprise instructions for receiving information about the location and orientation of the mobile device 100 from the location module 312 and the orientation module 316, respectively, and may also comprise instructions for receiving target information from the target module 328. Using this information, the fire control module 320 may track the relative position and orientation of the user of the mobile device 100, of any other players participating in the game, and of all (or at least nearby) targets in the game.

The fire control module 320 may further comprise instructions for receiving information about activation of a trigger 212 on the gameplay device 200 from the Bluetooth module 216 of the gameplay device 200, via the wireless transceiver 116 of the mobile device 100. Using this information, together with the tracked relative position and orientation of the various players and targets in the game and information about the particular weapon selected by the user of the mobile device 100 for the game (including, for example, information about the maximum range of the weapon, and the accuracy of the weapon at various ranges), the fire control module 320 can determine whether a given shot has hit a given target. In other words, the fire control module 320 determines whether the mobile device 100 was pointed in the right direction (based on the location of the mobile device 100 and the location of a given target) to hit the target. In some embodiments, the fire control module 320 may also obtain real-time weather data from an online weather database, and include effects of temperature, windspeed, humidity, air pressure, and/or other characteristics when calculating whether a given shot has hit a given target.

In making calculations to determine whether a given shot has hit a given target, the fire control module 320 may be programmed to calculate a likelihood that the shot would have hit the target under the existing conditions, and to score the shot as on-target if the likelihood is greater than a threshold amount. The threshold amount, moreover, may vary depending on whether the user of the game selected an easy game, a medium game, or a hard game. Also in some embodiments, the difficulty selection made by the user may be used to vary the size of the target used for calculating whether a given shot would have been on target. For example, when calculating whether a shot was on-target in an easy game, the fire control module 320 may be configured to treat the target as relatively large (such that a greater range of orientations of the mobile device 100, from a greater variety of locations of the mobile device 100, would be likely to hit the target). However, when calculating whether a shot was on-target in a hard game, the fire control module 320 may be configured to treat the target as relatively small (such that a smaller range of orientations of the mobile device 100, from a smaller variety of locations of the mobile device 100, would be likely to hit the target). The size of the target used by the fire control module 320 to determine whether a given shot has hit the target may or may not correspond to the size of the target as the target is visually depicted on the display 112 by the imaging module 308. In other words, the imaging module 308 may display an image of a small target (e.g. a small alien, a small zombie, a small robot, a small tank, a small fighter jet, a small spaceship), but the fire control module 320 may utilize target dimensions that are greater than those of the displayed target when calculating whether the target was hit by a particular shot.

Among the variables that may be included in the fire control module's calculations regarding whether a given shot has hit a target are: 1) the speed and direction of movement of the user (e.g. of the mobile device 100) that fired the shot; 2) the speed and direction of movement of the target; 3) any changes in the speed and direction of movement of the target, and if so whether those changes reflect a clear pattern (e.g. whether the target is maneuvering to evade fire); 4) actual or simulated weather conditions; 5) target size; 6) virtual weapon type (e.g. pistol, shotgun, rifle, sniper rifle, grenade, bazooka, rocket, missile, bomb); 7) virtual weapon destructiveness (e.g. a bomb will cause greater destruction than a pistol shot); 8) distance between the shooter and the target; 9) virtual weapon range; 10) mobile device 100 orientation at time of firing shot; and 11) real or virtual obstacles between user/weapon and target. Some or all of these variables, as well as additional variables not listed here but that will be evident to persons of ordinary skill in the art based upon the present disclosure, may be considered by the fire control module 320 in determining whether a given shot has hit a target.

In some embodiments of the present disclosure, the fire control module 320 may be configured to treat any damage to a target as a "kill." In other embodiments, the fire control module 320 may be configured to calculate an amount of damage caused to a target by a given shot, and each target may be given a predetermined amount of "health" or a predetermined number of "hit points" from which any damage amount sustained by the target is subtracted. In these embodiments, the fire control module only registers a target "kill" if the most recent shot that damaged the target caused the target's remaining "health" or "hit points" to reach zero. Here again, the fire control module may be configured to consider a plurality of variables in determining the amount of damage sustained by a target as a result of a particular shot, including but not limited to 1) the weapon type; 2) the weapon destructiveness; 3) the accuracy of the shot; 4) a "toughness" of the target (which may include or be based on whether the target is armored or otherwise shielded); and 5) whether any obstacles deflected the shot or otherwise shielded the target from greater damage from the shot.

Use of a fire control module 320 (or similar instructions, regardless of whether they are contained in a fire control module 320) to determine whether a given shot has hit a given target beneficially eliminates the need for the gameplay device 200 to comprise infrared or other directional transceivers for transmitting virtual "shots" to a target and detecting whether the gameplay device 200 has been "hit" by any such virtual "shots." This, in turn, reduces the cost of manufacturing the gameplay device 200 while reducing the number of powered electrical components needed on the gameplay device 200, allowing for one or both of smaller batteries and increased battery life.

The competition module 324 may track points accumulated by the user or users of a game hosted by the AR gaming app 300. For example, the competition module 324 may track the number of "hits" a user scores (e.g. the number of shots fired by the user that cause damage to a target); the number of "kills" a user scores (e.g. the number of targets that are eliminated or otherwise treated as sufficiently damaged by the user to qualify as "killed"); the number of shots evaded by the user; whether the user protected a teammate from enemy fire; the amount of virtual damage sustained by the user; and/or whether the user achieved any objectives other than eliminating targets (e.g. whether the user "captured" an enemy headquarters or an enemy flag, whether the user cleared a given area of the game arena of targets, whether the user successfully advanced beyond a predetermined threshold within the game arena). The competition module 324 may report point totals to the user or users of the AR gaming app 300, for example by providing information to the imaging module 308 that the imaging module 308 uses to display the point totals on the display screen 112. The competition module 324 may rank each user in a given game against other users in the game, and may identify as a winner of a given game the user with the highest point total. The competition module 324 may further cause a user's point total and/or game statistics (e.g. number of shots fired, accuracy of shots fired, amount of damage inflicted, number of targets killed) to be transmitted by a wireless transceiver 116 to the cloud, so that the user can be ranked against other users of the AR gaming app 300. In some embodiments, the competition module 324 may track a user's point totals and game statistics over a plurality of games, and may cause an updated point total and/or updated game statistics to be transmitted to the cloud via the wireless transceiver 116 for comparison with and/or ranking against other users of the AR gaming app 300.

The target module 328 may comprise instructions for generating virtual targets to be displayed by the imaging module 308, and/or for providing information about virtual targets to the fire control module 324. The target module 328 may track, based on information received from the fire control module 320, which targets are "alive," which targets have been "killed" or otherwise eliminated, and/or how much "health" or how many "hit points" each remaining target possesses. In generating virtual targets, the target module 328 may consider, among other variables, 1) a difficulty level selected by a user or users for the game in question; 2) the overall success of the user or users in damaging and/or eliminating previously generated targets; 3) the types of targets already in the game (e.g., if a virtual fighter jet has already been generated, the target module 328 may generate a tank instead of another fighter jet); and 4) objects identified in the image captured by the image sensor 108 (e.g. if a tree is identified in an image sensed by the image sensor 108, then the target module 328 may generate a tree-dwelling target or other target that relates to or is equipped to use the tree; if water is identified in an image sensed by the image sensor 108, then the target module 328 may generate a boat or other water craft, or other water-based enemy).

In some embodiments, the target module 328 may also track the virtual "health" or remaining "hit points" of the user, based on information received from the fire control module 320 about virtual damage sustained by the user. The target module 328 may comprise instructions for generating virtual objects that can restore a user's (or a target's) health or hit points if the user shoots, virtually picks up, or moves into the same location as such virtual objects.

The multiplayer module 332 may comprise instructions enabling the processor 104 of the mobile device 100 to communicate with one or more other mobile devices 100 also running an AR gaming app 300 during a multiplayer gaming session hosted by the AR gaming app 300 on the mobile device 100. During multiplayer gaming sessions, some functions of the various modules of the AR gaming app 300 may be provided only by one instance of the AR gaming app 300 (e.g. the instance that is running on the mobile device 100 of the user hosting the multiplayer gaming session), while other functions may be provided locally by the local instance of the AR gaming app 300 running on the mobile device 100 of each user participating in the multiplayer gaming session. In other embodiments of the present disclosure, each instance of the AR gaming app 300 running on the mobile devices 100 of the participants in the multiplayer gaming session may function as normal, and the multiplayer module 332 of each instance of the AR gaming app 300 may facilitate the sharing of any information that needs to be shared from one mobile device 100 to one or more of the other mobile devices 100 involved in the multiplayer gaming session, to ensure that the participants in the multiplayer gaming session are having a consistent experience (e.g. that each participant is fighting the same targets, that the location of the targets as seen by each participant is the same, that damage to a target by one participant is taken into account for other participants).

Each mobile device 100 of a user participating in the multiplayer gaming session may, for example, utilize an imaging module 308 stored in the memory 128 of the mobile device 100 to generate images for display on the screen 112 of the mobile device 100. Similarly, a fire control module 320 stored in the memory 128 of each mobile device 100 may be used to determine whether the user of that mobile device has successfully inflicted virtual damage or achieved virtual kills against targets and/or other participants in the multiplayer gaming session. However, in some embodiments, only the target module 308 (for example) of the AR gaming app 300 stored in the memory 128 of the mobile device 100 that is actually hosting the multiplayer gaming session may generate target information for targets seen by all players in the game.

The multiplayer module 332 may, therefore, coordinate communications with other mobile devices 100 involved in a multiplayer gaming session via the wireless transceiver 116. In some embodiments, such communications may occur over a public WiFi network with coverage over an entire geographic area, such as a city block or a plurality of city blocks. In such embodiments, a game hosted by the AR gaming app 300 may take place throughout the entire geographic area in which WiFi coverage is available. In other embodiments, such communications may occur over a local area WiFi network with coverage over, for example, an entire building, an entire building floor, or a purpose-built indoor or outdoor gaming arena (such as might be used for paintball, laser tag, or similar games). In still other embodiments, such communications may occur over a cellular network, which may enable the game to be played over as large or small a geographic area as desired by the participants of the game, limited only by the coverage of the cellular network. In further embodiments, such communications may occur over a peer-to-peer connection, whether using a WiFi, Bluetooth, or other communications protocol. In some embodiments, a dedicated WiFi hub may be used to facilitate communications among mobile devices 100 participating in a single multiplayer gaming session.

The multiplayer module 332 also facilitates the sharing, for example, of location information and orientation information among mobile devices 100 participating in a gaming session. The multiplayer module 332 may additionally facilitate the sharing, among the mobile devices 100 of users participating in the gaming session, of such information as the remaining "health" or "hit points" of the user associated with each mobile device, the "toughness" of the user associated with each mobile device (e.g. how resistant is the user to virtual damage, which may in some embodiments be based on a skill level of the user, as determined by such factors as total number of targets eliminated, total number of games won, total score, and/or number of hours played), and/or of the score achieved by each player (which may be based upon, for example, shot accuracy statistics, total virtual damage inflicted on targets and/or other users, total number of virtual "kills"). In some embodiments, the multiplayer module 332 may facilitate the sharing, among the mobile devices 100 of users in the multiplayer gaming session, of actions taken by each user. For example, if one user fires a shot, information about the fired shot (such as type of weapon fired, location from which the weapon was fired, location at which the fired shot exploded (if applicable)) may be shared with the mobile devices 100 of other users, which may in turn display an animation of the shot being fired by the user (if the user is visible on the display 112 of the mobile device 100 of any of the other users), and/or may cause a speaker 148 of the mobile devices of other users to play a sound corresponding to the firing of the shot, and/or may display an animation of the fired shot exploding (if applicable).

The multiplayer module 332 may also comprise instructions for interacting with the other modules of the AR gaming app 300. For example, the multiplayer module 332 may provide information about the location and orientation of other mobile devices 100 participating in the gaming session to the target module 328 (which may, in turn, use the information to generate targets in appropriate locations, and/or to cause generated targets to move, act, or react based upon the movements and/or actions of the plurality of mobile devices 100 participating in the gaming session). The multiplayer module 332 may also receive target information (including, for example, location and orientation information for a given target, a target type, and/or remaining "health" or "hit points" of a target) from the target module 328, and may cause the sharing of such information with the mobile devices 100 of other users in the gaming session. The mobile devices 100 of other users in the gaming session may receive the target information and provide it to an imaging module 308 of an AR gaming app 300 running thereon, which imaging module 308 may selectively display to each user on the screen 112 of each user's mobile device 100 the targets that are in the field of view of the user. When the target information includes orientation information about the target, the target is displayed on the screen 112 of the mobile device 100 of each user who is located and oriented so that the target is within the user's field of view. Further, the target may be displayed based on the target's location and orientation and the user's location and orientation, so that if a user is standing in front of but looking at the target, the user will see the front of the target, while another user standing in back of but looking at the target will see the back of the target.

In some embodiments, a multiplayer gaming session hosted by the AR gaming app 300 may be configured so that all participants in the multiplayer gaming session are working together to eliminate targets generated by the target module 328 (and/or to accomplish other game objectives, such as virtually capturing a particular territory or flag, or crossing a particular threshold without being virtually killed). In other embodiments, a multiplayer gaming session may be configured so that some or all of the participants in the multiplayer gaming session are virtually battling or otherwise working against each other (whether individually or in teams). In such embodiments, the multiplayer module 332 may also provide information about the location and orientation of other mobile devices 100 participating in the gaming session to the fire control module 320, which may use such information to determine whether a virtual shot fired by the mobile device 100 has virtually hit and/or damaged another user. In such embodiments, the mobile device 100 of a user that has been virtually hit and/or damaged may display one or more images or animations that indicate to the user that the user has been virtually hit and/or damaged, and may also reduce the functionality of the mobile device 100 of the virtually hit and/or damaged user (within the AR gaming app 300) based on the amount of virtual damage sustained.

As noted previously, the various functions described above with respect to the settings module 304, the imaging module 308, the location module 312, the orientation module 316, the fire control module 320, the competition module 324, the target module 328, and the multiplayer module 332 may be combined into fewer modules or divided into a greater number of modules. In particular, the function(s) of any two or more modules may be combined into a single module, and the function(s) of any one module may be divided into two or more modules.

Referring now to FIG. 4, a glove 400 may be used instead of a gameplay device 200 in some embodiments of the present disclosure. The glove 400 comprises a Bluetooth module 404, which may be the same as or substantially similar to the Bluetooth module 216, and may comprise a power source (e.g. a battery). The glove 400 also comprises a plurality of sensors 408a-d, located on a palm portion of the glove 400, with each sensor 408a-d positioned to detect a touch or tap of a fingertip 412a-d, respectively, or to detect that a fingertip 412a-d has moved within close proximity of the sensor 408a-d. In some embodiments, the fingertips 412a-d may comprise a magnet to facilitate sensing of the location of the fingertips 412a-d by the sensors 408a-d. Such magnets may be sufficiently unique from each other to allow the sensors 408a-d to identify a location of each specific fingertip 412a-d.

The glove 400 may further comprise a button or other input device 416, positioned to be activated by the thumb of a user of the glove 400.

In operation, the Bluetooth module 404 of the glove 400 may be paired with a mobile device, such as the mobile device 100. Unlike with the gameplay device 200, in embodiments of the present disclosure utilizing a glove 400, the mobile device 100 is not secured or otherwise attached to the glove 400. The mobile device 100 may instead be held by the user (e.g. by a hand other than the hand wearing the glove 400), or supported by a hat or other headgear worn by the user so that the display 112 is positioned within the user's line of sight, or otherwise located so that the user can see the display 112 and an image sensor 108 can capture images of the physical environment in front of or faced by the user.

With the Bluetooth module 404 paired to a mobile device 100, the glove 400 may be used in substantially the same way as the gameplay device 200. More specifically, each sensor 408a-d may act as a trigger for firing a separate weapon or accomplishing other gameplay functions. Thus, when the user moves, for example, fingertip 412a adjacent the sensor 408a, the sensor 408a may send a signal to the Bluetooth module 404, which may in turn send a signal or a plurality of signals to the mobile device 100 indicating that the sensor 408a has been activated. This signal or plurality of signals may have the same effect as the signal or plurality of signals received by the mobile device 100 indicating that the trigger 212a has been activated. By including four sensors 408a-d with the glove 400, up to four separate "triggers" may be simulated by the glove 400.

Additionally, the button 416 may be used to cause an imaging module 308 to cycle through different types of information displayed on the display screen 112 of a connected mobile device 100, or to cycle through different functions of one or more of the sensors 408a-d. For example, activation of the sensor 408a may selectively cause a rifle shot to be fired, or result in a virtual "pick-up" motion (e.g. to allow the user to "pick up" virtual health kits, hit point restoration kits, armor kits, and/or weapon kits that are displayed on the screen 112). In such embodiments, activation of the button 416 may determine which action is triggered by the sensor 408a. The button 416 may also be used, in some embodiments, to select from among a plurality of menu items displayed on the display 112 before, during, or after a game hosted by the AR gaming app 300.

The sensors 408a-d may be powered by the same power source that powers the Bluetooth module 404, which may or may not be replaceable and/or rechargeable. Alternatively, the sensors 408a-d may be powered by a separate power source, also replaceable and/or rechargeable in some embodiments, from the Bluetooth module 404. In still other embodiments, each sensor 408a-d may comprise a separate power source, which again may be replaceable and/or rechargeable. The sensors 408a-d may be in wired or wireless connection with the Bluetooth module 404. Additionally, the glove 400 may comprise a power switch for turning the Bluetooth module 404 and/or the sensors 408a-d on and off.

A number of variations and modifications of the foregoing disclosure can be used. It would be possible to provide for some features of the disclosure without providing others.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and/or reducing cost of implementation.

The foregoing discussion has been presented for purposes of illustration and description. The foregoing is not intended to limit the disclosure to the form or forms disclosed herein. In the foregoing Detailed Description, for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, and ARM® Cortex-A and ARM926EJS™ processors. A processor as disclosed herein may perform computational functions using any known or future-developed standard, instruction set, libraries, and/or architecture.

I claim:

1. An augmented reality gaming system, comprising:
   a gameplay device comprising:
      a mount;
      a first wireless transceiver; and
      a plurality of triggers, each corresponding to a virtual weapon,
      wherein the gameplay device does not include an infrared transmitter and does not include an infrared receiver; and
   a mobile device removably secured to the mount, the mobile device comprising:
      a processor;
      a screen;
      an image sensor;
      a location sensor;
      an orientation sensor;
      a second wireless transceiver; and
      a memory, the memory storing an augmented reality gaming app comprising instructions for execution by the processor that, when executed by the processor, cause the processor to:
         display, on the screen, a live image received from the image sensor;
         receive location information from the location sensor;
         generate target information about at least one target;
         display, on the screen and based on the location information, a graphical depiction of the at least one target as an overlay on the live image;
         receive, via the second wireless transceiver and from the first wireless transceiver, an indication of activation of one of the plurality of triggers, wherein activation of the one of the plurality of triggers corresponds to firing the virtual weapon corresponding to the one of the plurality of triggers;
         display an animation on the screen in response to the indication;
         receive orientation information from the orientation sensor; and
         calculate, based on the location information, the orientation information, and the target information, whether the firing of the virtual weapon caused virtual damage to the target.

2. The augmented reality gaming system of claim 1, wherein the target information comprises target location information and target size information.

3. The augmented reality gaming system of claim 1, wherein the augmented reality gaming app comprises additional instructions for execution by the processor that, when executed by the processor, further cause the processor to:
   award points based on an amount of virtual damage caused to the target.

4. The augmented reality gaming system of claim 1, wherein the screen is a touchscreen, and further wherein the augmented reality gaming app comprises additional instructions for execution by the processor that, when executed by the processor, further cause the processor to:
   receive, via the touchscreen, a user selection for one of a single player and a multiplayer game.

5. The augmented reality gaming system of claim 4, wherein the user selection corresponds to a multiplayer game, and further wherein the augmented reality gaming app comprises additional instructions for execution by the processor that, when executed by the processor, further cause the processor to:
   receive, via the second wireless transceiver, second location information about a location of a second mobile device.

6. The augmented reality gaming system of claim 5, wherein the augmented reality gaming app comprises additional instructions for execution by the processor that, when executed by the processor, further cause the processor to:
   calculate, based on the location information, the orientation information, and the second location information, whether the firing of the virtual weapon caused virtual damage to a user of the second mobile device.

7. An AR gaming system comprising:
   a gaming device comprising:
      an adjustable mount;
      a plurality of triggers, each corresponding to a virtual weapon;
      a power source shaped in a form of a bullet magazine; and
      a secondary wireless transceiver,
      wherein the gaming device does not include an infrared transmitter and does not include an infrared receiver; and
   a first mobile device removably secured to the adjustable mount, the first mobile device comprising:
      a processor;
      a location sensor;
      an orientation sensor;
      an image sensor;
      a primary wireless transceiver;
      a screen; and
      a memory, the memory storing instructions for execution by the processor that, when executed by the processor, cause the processor to:
         establish a multiplayer gaming session among a plurality of mobile devices including the first mobile device, each of the plurality of mobile devices corresponding to a player;

receive, via the primary wireless transceiver, information about a location of the plurality of mobile devices other than the first mobile device;

receive location information about the first mobile device from the location sensor;

transmit, via the primary wireless transceiver, the location information;

generate target information about a plurality of virtual targets, the target information comprising at least target location information and target orientation information;

transmit the target information via the primary wireless transceiver;

display, on the screen, a live image based on data received from the image sensor;

receive orientation information about the first mobile device from the orientation sensor; and selectively display on the screen, based on the location information, the orientation information, and the target information, at least one virtual image representing a target, the at least one virtual image overlaid on the live image.

8. The AR gaming system of claim 7, wherein the memory stores additional instructions for execution by the processor that, when executed by the processor, further cause the processor to:

receive, from the secondary wireless transceiver and via the primary wireless transceiver, a signal indicating user interaction with one of the plurality of triggers;

display, on the screen and based on the signal, an image sequence; and transmit, via the primary wireless transceiver, information corresponding to the signal.

9. The AR gaming system of claim 8, wherein the signal corresponds to firing of the virtual weapon corresponding to the one of the plurality of triggers.

10. The AR gaming system of claim 9, wherein the memory stores additional instructions for execution by the processor that, when executed by the processor, further cause the processor to:

calculate, based on at least the orientation information, the location information, and the target information, whether the firing of the virtual weapon caused virtual damage to at least one of the plurality of targets or to at least one of the players corresponding to the plurality of mobile devices other than the first mobile device.

11. The AR gaming system of claim 7, wherein a change in the target orientation information results in a change in the at least one virtual image.

12. A gaming system comprising:

a gameplay device without an infrared transmitter, the gameplay device configured to hold a mobile device and comprising:

a plurality of triggers, each of the plurality of triggers corresponding to a different virtual weapon; and a first wireless transceiver;

the mobile device comprising:

a processor;

a touchscreen;

a location sensor;

an orientation sensor;

an image sensor;

a second wireless transceiver; and a memory, the memory storing instructions for execution by the processor that, when executed by the processor, cause the processor to:

display a live image on the touchscreen based on a signal from the image sensor;

generate target information about at least one target;

overlay a graphic on the live image based on the target information, the graphic corresponding to the at least one target;

receive an indication, from the first wireless transceiver and via the second wireless transceiver, that one of the plurality of triggers has been pulled, the indication corresponding to a firing of the virtual weapon corresponding to the one of the plurality of triggers;

receive orientation information from the orientation sensor; and determine, based on the orientation information and the target information, whether the firing of the virtual weapon resulted in virtual damage to the at least one target.

13. The gaming system of claim 12, wherein the virtual weapon corresponding to the one of the plurality of triggers is a rifle or a grenade launcher.

14. The gaming system of claim 12, wherein the gameplay device comprises a mount with an adjustable slant and/or tilt.

15. The gaming system of claim 12, wherein the memory stores additional instructions for execution by the processor that, when executed by the processor, cause the processor to:

transmit the target information via the second wireless transceiver; and receive, via the second wireless transceiver, information about a location of a second mobile device.

16. The augmented reality gaming system of claim 1, further comprising a fire control module.

17. The augmented reality gaming system of claim 16, wherein the fire control module obtains real-time weather data from an online weather database.

18. The augmented reality gaming system of claim 16, wherein the fire control module incorporates an effect of at least one of a temperature, a windspeed, a humidity, or an air pressure when calculating whether a shot has hit the at least one target.

19. The augmented reality gaming system of claim 12, wherein the gameplay device comprises a cable that removably attaches to a port on the mobile device to provide power to the mobile device.

20. The AR gaming system of claim 7, further comprising a cable that removably attaches to a port on the first mobile device to transfer power from the power source to the first mobile device.

* * * * *